UNITED STATES PATENT OFFICE 2,236,668

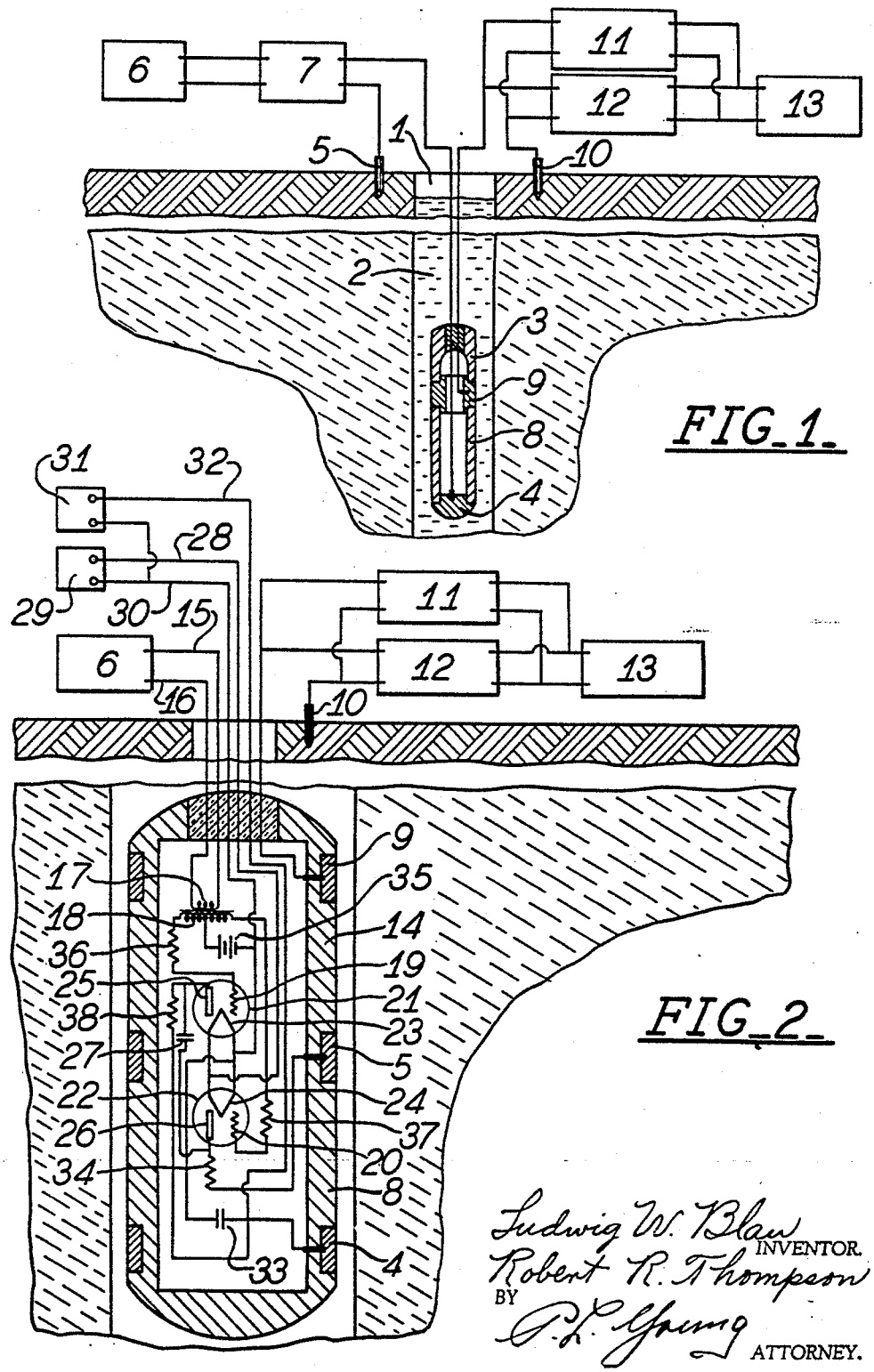

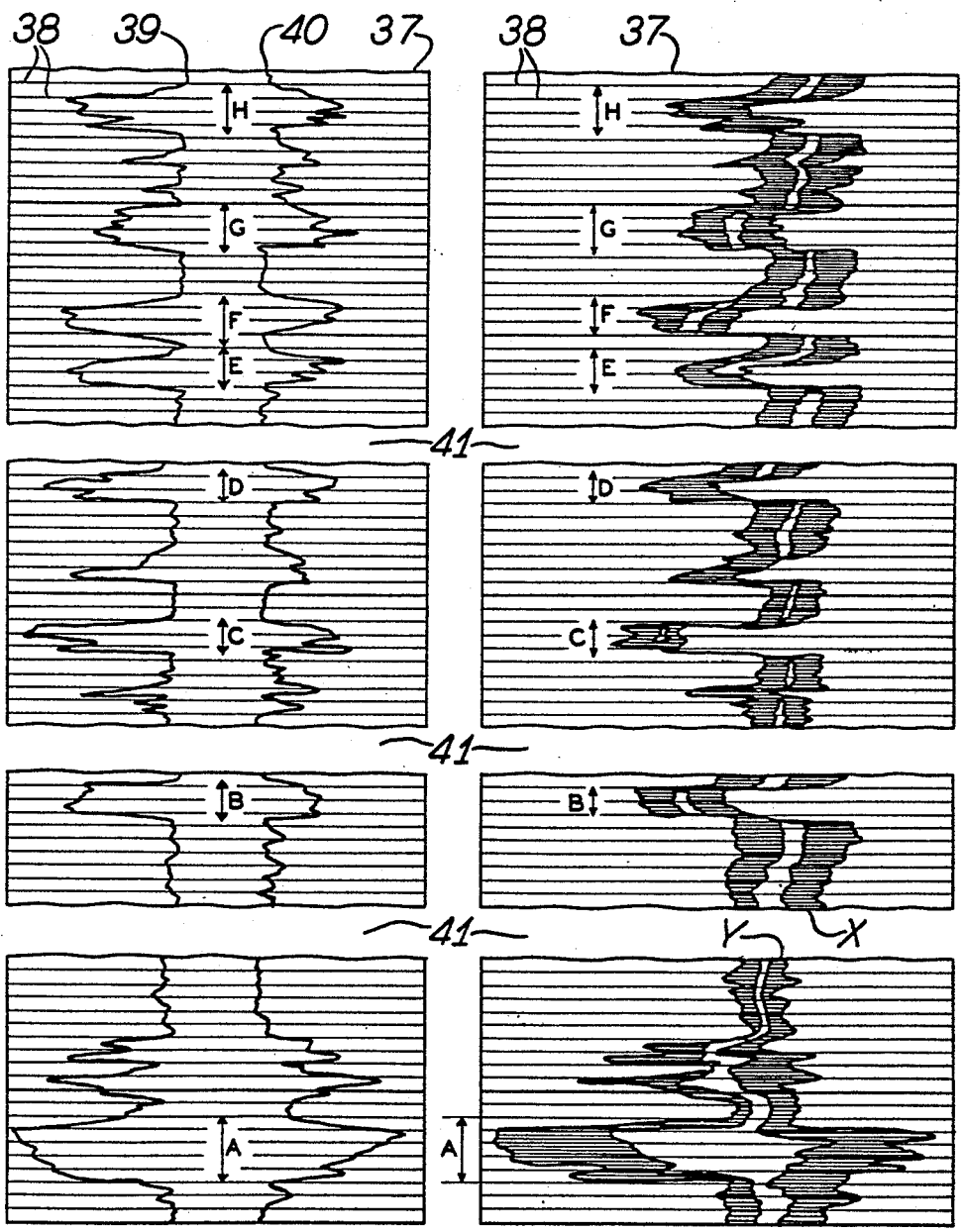

METHOD AND APPARATUS FOR LOGGING WELLS

Ludwig W. Blau and Robert Russell Thompson, Houston, Tex., assignors to Standard Oil Development Company, a corporation of Delaware Application May 11, 1938, Serial No. 207,266

15 Claims. (Cl. 175—182)

The present invention is directed to a method and apparatus for logging boreholes, particularly with the object of locating oil-bearing formations.

As is known, the exact location of an oil-bearing formation in a borehole is of paramount importance to the driller. From the day when the practice of determining the arrival of the drill bit at an oil-bearing formation by the occurrence of a gusher was abandoned, it became necessary to devise means and methods for enabling the operator to determine when he has penetrated an oil-bearing formation. Among the earliest of these methods, and still the most reliable of them, was the practice of coring, according to which the operator affixes a special coring bit at the end of the drill stem and drills out a sample of the formation to be investigated, collecting this sample in a receptacle arranged behind the bit, bringing it to the surface, and examining it by chemical and physical means. In determining when to run a core test, the operator is guided by his drilling experience in observing the nature of the cuttings, by geological and geophysical estimates of the depth of the suspected producing formation, and by the depth of such formations as indicated by neighboring wells.

Due to the expense involved in running a core test, attempts have been made from time to time to develop methods and means for securing the same information in a simpler manner. Thus far, a number of electrical methods have been devised but none of them is sufficiently reliable to replace coring. They are, however, valuable supplements to coring in that they can be used to verify the results of a core test and to define the limits of the producing formation. Moreover, where the approximate depth of a formation in a given area has been established by one well, coring tests can be dispensed with in the remaining wells in that location, since the producing formation can be followed by the electrical methods.

One electrical method in common use comprises the measurement of the apparent resistance of subsurface formations to a direct electrical current and the measurement of the natural potential of these formations. This natural earth potential is a phenomenon that was first recognized by Quincke in 1859, who postulated that fluids passing through the pores of a solid body set up a difference of potential. This phenomenon is utilized in well-logging by grounding one electrode of a pair of electrically connected electrodes at the surface and lowering the other electrode through the borehole which must, obviously, be filled with a conductive liquid so that the potential of the formation can be impressed upon the electrode in the borehole.

In carrying out this method four electrodes are employed, two for charging and two for measuring. At least one charging and one measuring electrode are lowered in the borehole. A battery is applied to the charging electrode. In order to measure natural earth potential, the battery is periodically cut out. It is also generally necessary to reverse the current direction frequently in order to avoid polarization effects resulting from the direct current. Two records are produced, a potential log and a resistance log, and these must be correlated with depth.

As an improvement over the above described procedure the practice has been adpoted of using only a single electrode in the borehole, applying alternating current to this electrode and measuring at the surface the natural earth potential and the earth impedance simultaneously, at each electrode depth. Here again, two records are produced but they are automatically correlated with depth and require no matching since the same electrode can be employed for both natural earth potential and impedance measurements.

With either of the above methods, however, a record is produced on which an oil sand is supposed to be indicated by certain combinations of earth potential and resistance or impedance. For example, in the latter method a high impedance coupled with a high potential indicates an oil sand. A somewhat similar combination of values, however, designates a gas sand. Thus, on the record may be found a number of combinations of high potential and high impedance. Unless there is available some information as to the approximate location of the oil sand, it is difficult to select with certainty a combination of values which designate the oil sand.

According to the present invention a method is provided for obtaining an electrical log on which the oil sand will stand out in bold relief. This method utilizes two pairs of electrodes with at least one of each pair lowered into the borehole. The two electrodes lowered into the borehole are usually part of a single bomb, the electrodes being spaced, exposed, conductive surfaces on the bomb. Power is supplied to one pair of electrodes by an oscillator coupled with an inverter which so modifies the output of the oscillator as to supply to the borehole electrode a square topped unidirectional wave. Thus, for each cycle of the oscillator output, two transients are set up in the earth adjacent the borehole electrode. These transients are picked up by the other pair of electrodes in the circuit of which are a D. C. amplifier and an A. C. amplifier, the outputs of both of which are fed to a single recording high-frequency galvanometer. That is to say, the lead coming to the surface from the borehole electrode of the second pair is divided at the surface into two leads, one of which goes to a D. C. amplifier and the other of which goes to an A. C. amplifier. Both amplifiers are grounded by the other electrode of the second pair.

The record produced by the above described procedure is a composite of the natural earth potential and the transient picked up by the receiving electrode. These transients, in passing through the amplifying system, are actually converted into plate current pulses which are the values recorded. It is not known precisely what significant property of the substrata this value represents. For reasons given hereinafter it does not appear that this recorded value is an indication of the impedance alone of the substrata. On the other hand, it is clear from the nature of the current employed that it cannot be resistance alone. Due to the fact that transients have components of very high frequencies, it is postulated that the value recorded may in some way be associated with the di-electric constant of the various substrata, which may account for the fact that in the records produced, according to this invention, the oil bearing formation is brought out in a striking manner. This is reasonable when one considers that every electrical property of a medium is reflected in the transient of a current passed through it. Whatever be the electrical properties of the substrata which are reflected in the record made according to the present invention, they include some property which distinguishes between porous formations containing oil and porous formations containing other fluids, such as gas or salt water.

It has hitherto been proposed to use transient phenomena for well-logging. In application, Serial No. 73,234, filed April 8, 1936, there is described a well-logging method in which transient phenomena are utilized. In this previous method, however, no effort was made to measure natural earth potential, the specific feature of said previous method being the measurement of the high frequency components of the transients obtained.

The nature of the method according to the present invention will be more fully understood from the following detailed description of the accompanying drawings in which—

Figure 1 is a schematic view of an arrangement suitable for the practice of the method of the present invention;

Figure 2 is a view similar to Figure 1 showing in vertical cross section a modified electrode;

Figure 3 is a pictorial reproduction of a record produced by the potential-impedance logging method; and Figure 4 is a pictorial reproduction of a record produced according to the present invention in the same hole as the record shown in Figure 3.

Referring to the drawings in detail, numeral 1 designates a borehole filled with a drilling fluid 2. A bomb 3 is shown suspended in the hole, said bomb being provided with a strip 4 of conductive material which constitutes one electrode of a pair, the other of which, designated by numeral 5, is grounded at the surface. In the circuit connecting these electrodes are an oscillator of any conventional type 6, the output of which is fed to an inverter 7 which is also of known construction and will be described in detail in connection with Figure 2. The output of the inverter is impressed across electrodes 4 and 5 and is the current from which the transients picked up by the receiving electrodes are produced.

Spaced from electrode 4 on bomb 3 by insulating material 8 is a conductive ring 9 which constitutes an electrode of a pair, the other of which, designated by numeral 10, is grounded at the surface. In some cases an additional advantage may be obtained by also making electrode 10 a part of bomb 3, as a conductive ring spaced from electrode 9, or by grounding electrode 10 by connecting it electrically to the metallic sheath of the cable which carries the conductors in the borehole. Connected in parallel with electrodes 9 and 10 are a D. C. amplifier, of conventional construction 11, and an A. C. amplifier, of conventional construction 12, having a transformer input and output with a plurality of stages of vacuum tube amplification between them, the electrode 9 being connected to the primary of the input transformer.

The outputs of these two amplifiers are fed in parallel to a recording galvanometer 13 which is of the conventional type having a moving coil carrying a mirror which reflects light from an exterior source onto a photo-sensitive strip of paper which in accordance with customary practice in this art is moved across the path of the beam of light emanating from the galvanometer at a rate corresponding to the rate of movement of the electrode in the borehole, said strip being provided automatically with transverse lines indicating depth of the electrode in the borehole.

As will be understood, the conductors leading from the bomb to the surface equipment are contained in a cable which is generally passed over a sheave at the mouth of the borehole to a drum which has a slip ring arrangement through which the conductors are connected to the equipment at the surface in the manner indicated. This conventional equipment does not constitute a part of the present invention and is omitted from the drawings in the interest of clarity.

The arrangement shown in Figure 2 differs from that shown in Figure 1 in that the inverter circuit is contained in the bomb 3 instead of being located at the surface. This arrangement has the advantage that it makes possible more accurate control of the wave form of the current fed into the subsurface formation since any wave form created by the inverter at the surface will be slightly distorted in passing through the cable. In addition, this arrangement makes it possible to obtain stronger transients.

In this modified arrangement, the bomb is designated by numeral 14 in which the charging electrodes 4 and 5 and the pickup electrode 9 are formed as metallic rings embedded in insulating material 9. In this arrangement, six conductors are contained in the cable on which the bomb is suspended. Conductors 15 and 16 carry the output of oscillator 6 to the primary 17 of a transformer arranged in the bomb. The secondary 18 of this transformer is connected across the grids 19 and 20 of tubes 21 and 22, of the gas discharge type, respectively, which have their respective filaments 23 and 24 connected together. The plate 25 of tube 21 is connected to the plate 26 of tube 22 through a condenser 27. A conductor 28 connects the positive terminal of an A battery 29 at the surface to the filaments 23 and 24 to which is also connected a conductor 30 connected to the negative side of the A battery and also to the negative side of a B battery 31, the positive terminal of which is connected by a conductor 32 to plate 25 of tube 21, to electrode 4 and, through a condenser 33, to the ground side of the filaments 23 and 24. Plate 26 of tube 22 is connected through a resistance 34 to electrode 5. A "C" battery 35 is connected between secondary 18 and ground wire 30 to supply biasing voltage for grids 19 and 20, resistances 36 and 37 being arranged between battery 35 and the respective grids. Numeral 38 designates a resistance arranged between battery 31 and plate 25.

The current supplied to primary 17 is generally of a sinusoidal type. This means that the voltages on grids 19 and 20 will be alternately building up. If it be assumed that the voltage on grid 19 is building up, it will reach a value sufficiently high to fire the tube at which time a plate current begins to flow. In the meantime, condenser 33 is being charged by the B battery. It may be noted here that the B battery merely serves to keep the condenser 33 constantly charged and the condenser 33 is actually the source of power in the bomb. So, when plate current begins to flow in tube 21 it flows from the condenser 33 through resistance 37 and plate 25 to filament 23 and thus to the ground. It cannot flow out through electrode 4 since there is no return for it to the circuit. Meanwhile, the grid voltage on grid 20 has begun to build up to a point where tube 22 fires, causing plate current to flow therein. This plate current flows from condenser 33 through electrode 4 to the formation back through electrode 5 through resistance 34 to plate 26 and thus to filament 24 and to ground.

Thus, it can be seen that while the current supplied to the secondary 18 and to the tube, is of the sinusoidal type, only one half of each cycle is passed through the formation. This half of a cycle instead of being sinusoidal in shape is square topped because each tube fires when the grid voltage reaches a certain point causing the flow of plate current, which continues until the grid voltage reverses and reaches a point at which the other tube fires. The condenser 27 is provided to insure the complete extinction of each tube after the grid voltage drops below the firing point.

The frequency of the charging current employed may vary within wide ranges. It is, of course, desirable that the frequency be sufficiently high with respect to the speed of travel of the bomb in the borehole to provide a number of cycles per foot of travel. Thus, with a bomb speed of 180 feet per minute, a 60 cycle current will supply 20 square topped impulses, or 40 transients per foot of travel. In view of the fact, however, that an observed transient may last only $1/100$ of a second, and that there are two of these transients for each square topped impulse, it is apparent that in order to get the full effect of the transients it is preferable to operate with a frequency not higher than 50 cycles per second. The actual configuration of the transients can be more closely approximated by increasing the ratio between bomb speed and frequency.

Figures 3 and 4 demonstrate the difference between the record obtained by the above described procedure and the record obtained by the established practice of separately recording the natural earth potential and the earth impedance. Referring to Figure 3, numeral 37 designates a strip of photosensitive paper provided with depth lines 38. The irregular line 39 represents natural earth potential at successive depths while the irregular line 40 represents the earth impedance at the same successive depths. The blank spaces 41 indicate portions of the record on which no significant changes occur and which, accordingly, have been omitted.

Zone A of this record designates an oil sand. It will be noted that in this zone the impedance is high as is also the natural earth potential. It will be noted, however, that at various other points along the record, such as zones B, Z, D, E, F, G, and H, there is a simultaneous occurrence of a high impedance and a high earth potential. The main difference between zone A and the other zones is that it is wider, but this difference is not significant in differentiating an oil sand from other substrata because an oil sand is not necessarily or not even usually thicker than water sand, for example. Both the earth impedance and earth potential in zone A are somewhat higher than in the other zones but only in a matter of degree since it will be noted that in section C the earth potential is substantially the same as in zone A and the impedance is only slightly smaller than in zone A. Moreover, records of this type are frequently produced in which the impedance and earth potential in a non-oil bearing zone are as high as they are in an oil sand.

In Figure 4, parts which are common with Figure 3 bear the same numeral. As has been previously explained, this record is produced by impressing both the earth transient and the the earth potential on the same recording galvanometer. The earth potential moves the mirror of the galvanometer off of its normal null point an amount corresponding to the earth potential. The current resulting from the transients causes the mirror to oscillate about the null point established by the earth potential. Thus, the potential values are represented by a line passing through the center of the white portion of the record, while the rate of building up of the transients is represented by the degree of deflection on either side of the center of the white portion.

It is to be emphasized at this point that the oscillations of the galvanometer about the null point, established by the earth potential, are not indicative of the impedance or resistivity of the earth strata, but are indicative of the rate of the building of and decay of the earth transients. As can be seen from Figures 1 and 2, the earth currents picked up by electrode 9 are connected to an A. C. amplifier in which they are passed through the primary of a transformer. Voltages are induced into the secondary of the transformer of a value not depending upon the value of the current passing through the primary, but upon the rate of change in value of the current passing through the primary. This rate of change is the earth transient. Thus, the voltages induced in the secondary, and amplified in the A. C. amplifier, are a direct function of the earth transients. Since a square topped unidirectional wave is applied to the earth, there will be two earth transients for each cycle of the applied current, the one transient resulting from the change of value of the applied current from zero to its maximum value, and the other transient resulting from the change of the applied current from its maximum value to zero. These two transients will be in opposite directions, thereby accounting for the fact that the voltages induced in the secondary of the transformer produce deflections on both sides of the null point of the galvanometer. In between these transients the current has a fixed value, and does not induce any voltage in the secondary of the transformer. If it is desired to secure simultaneously some indication of earth resistivity, this can be done by connecting a potentiometer across the primary of the transformer, this potentiometer being sufficiently damped to be insensitive to the earth transient and capable only of recording the fixed value of the earth currents.

Referring to Figures 3 and 4, it will be noted that in zone A of Figure 3, there is a change in potential corresponding to the change in potential in zone A of Figure 4, and an increase in the amplitude of deflection of the galvanometer around its null point corresponding to the increase in impedance in zone A of Figure 3.

Likewise, in zone B of Figure 4, there is an increase in potential corresponding to the increase in potential in zone B of Figure 3. But there is no increase in amplitude of the oscillations of the galvanometer in zone B of Figure 4 corresponding to the increase in impedance in zone B of Figure 3. In fact, the amplitude of oscillations of the galvanometer in zone B of Figure 4 is less than it is in the zone just below zone B, although in Figure 3 the impedance below zone B is less than it is in zone B.

Again, in zone C, of Figure 4, there is an increase in potential corresponding to the increase in potential in zone C of Figure 3, but there is no increase in the amplitude of oscillations of the galvanometer in zone C of Figure 4 corresponding to the increase in impedance in zone C of Figure 3. The same condition is found to exist in zones D, F, G, H and I of the respective records. It may be explained here that the decrease in amplitude of oscillations between points X and Y in Figure 4 was caused by the fact that at this point the sensitivity of the galvanometer had to be decreased in order to keep the deflection at zone A on the paper. In other words, were zone A recorded with a galvanometer of the same sensitivity as zones B, C, D, etc., the difference in amplitude of oscillations between them would be even more marked than it is.

A consideration of Figures 3 and 4 in the light of the above discussion substantiates the point previously made in this description that in the method of the present invention there is some electrical property of the ground, other than impedance or resistivity, measured, and this electrical property of the ground is one which serves to distinguish oil sands from water sands in a much more striking manner than was possible with previous methods. One may assume, with some propriety, that a transient builds up, or decays, in an oil sand faster than it does in a water sand, thereby impressing a greater rate of change of current value on the primary of the transformer in the amplifier, thus accounting for the very much greater deflection of the galvanometer in an oil sand. It must be borne in mind that this rate of building up or decay of the current is not uniquely associated with the impedance or resistance of the medium in which the current is building up, since these electrical properties of the ground bear most directly on the maximum fixed value which the current attains, and this maximum fixed value is not revealed in the record obtained by the method of the present invention and shown in Figure 4.

While the present invention has been described above with particular reference to the use of transients in electrical well-logging in such a way as to produce a record which is a composite of natural earth potential and earth transients correlated with depth, it is to be understood that the production of such a composite record is not restricted to a method in which transients are recorded. It is also possible to produce a composite record, according to the present invention, by omitting the inverter 7, from the charging circuit, thereby applying a sinusoidal current to the earth. In this case, of course, the sinusoidal current, modified by the earth impedance, is picked up by the electrode 9. The record produced, however, is of the same general character as that shown in Figure 4 in that it has a central line which follows changes in natural earth potential and oscillations about this central line.

It is to be understood that the present invention is not restricted to the particular apparatus disclosed, but contemplates the use of other types of apparatus for the production of a composite record of natural earth potential along a borehole and electrical properties of the substrata traversed by the borehole, particularly those properties which are reflected in current transients produced in said substrata, while correlating these values with depth. In other words, the appended claims are not restricted to the specific apparatus and procedure described above, but are intended to cover the present invention as broadly as the prior art permits.

It is claimed:

1. A method for producing a composite well-log which comprises moving a pair of spaced conductive elements along a borehole filled with an aqueous fluid, feeding to one of said conductive elements a unidirectional current having a wave form varying between a minimum and a maximum value, picking up said current after its passage through the substrata around the borehole by said other conductive element at successive points along said borehole, simultaneously picking up, by said other conductive element, the natural earth potential between each of said successive points and a fixed point, simultaneously applying said picked up current and potential to a recording instrument having a movable element sensitive to both, and recording the movement of said element.

2. A method for producing a composite well-log which comprises moving a pair of spaced conductive elements along a borehole filled with an aqueous fluid, feeding to one of said conductive elements a unidirectional current having a wave form varying between a minimum and a maximum value, picking up said current after its passage through the substrata around the borehole by said other conductive element at successive points along the borehole, simultaneously picking up the natural earth potential between each of said points and a fixed point, converting the picked up current into a voltage of a value determined by the rate of change of said current, and simultaneously applying the voltage so produced and the natural earth potential to a recording instrument having a movable element sensitive to both, and recording the movement of said element.

3. A method for producing a composite well-log which comprises moving a pair of spaced conductive elements along a borehole filled with an aqueous fluid, feeding to one of said conductive elements a unidirectional current having a square topped wave form, picking up said current after its passage through the substrata around the borehole by said other conductive element at successive points along the borehole, simultaneously picking up the natural earth potential between each of said points and a fixed point, converting the picked-up current into a voltage of a value determined by the rate of change of said current, and simultaneously applying the voltage so produced and the natural earth potential to a recording instrument having a movable element sensitive to both, and recording the movement of said element.

4. A method for producing a composite well-log which comprises moving a pair of spaced electrodes in a borehole filled with an aqueous fluid, causing a current of changing value to flow between said electrodes through the substrata around the borehole, lowering a third electrode in said borehole in spaced relation to said pair of electrodes and in the field of said current of changing value, simultaneously picking up with said third electrode the voltage resulting from the field of said current and the natural earth potential at successive points along the borehole, simultaneously applying said voltages to a recording instrument having a movable element sensitive to both, and recording the movement of said element.

5. An apparatus for logging a well comprising an electrode adapted to traverse a borehole, means for applying a current of changing value to said electrode, a second electrode adapted to traverse the borehole in spaced relation to the first and to pick up simultaneously the current applied to the first electrode after its passage through the substrata around the borehole and the natural earth potential at successive points along said borehole, and a recording instrument electrically connected to said second electrode having a movable element sensitive to both a steady state voltage and a changing voltage.

6. An apparatus for logging a well comprising a bomb adapted to be lowered into the well, a pair of spaced conductive surfaces insulated from each other arranged on said bomb and exposed on its surface, a conductor connecting one of said conductive surfaces to a surface circuit, a source of current of changing value in said circuit, a second conductor connecting the other conductive surface to a second surface circuit, and a recording instrument in said second surface circuit having a movable element sensitive to both a constant and a changing voltage.

7. An apparatus for logging a well comprising a pair of electrodes at least one of which is adapted to be lowered into the well, a circuit connecting said electrodes including an oscillator, a second pair of electrodes at least one of which is adapted to be lowered into the well in spaced relation with the well electrode of the first pair, and a circuit connecting said second pair of electrodes including a recording instrument having a movable element sensitive to both a constant and a changing voltage.

8. An apparatus, according to the preceding claim, in which the recording instrument in the second circuit is connected thereto through a pair of amplifiers, one of which is a D. C. amplifier and the other of which is an A. C. amplifier, having a transformer input and output.

9. An apparatus, according to claim 7, in which the first mentioned circuit contains an inverter for receiving the output of the oscillator and delivering it to the electrodes.

10. An apparatus for logging a well comprising a bomb adapted to be lowered into the well having three conductive exposed surfaces spaced and insulated from each other, means for supplying a current of changing value to a pair of said conductive surfaces, a conductor connecting the remaining conductive surface to a grounded surface circuit, and a recording instrument in said surface circuit having a movable element sensitive to both a constant and a changing voltage.

11. An apparatus for logging a well comprising a bomb adapted to be lowered into the well having three exposed conductive surfaces spaced and insulated from each other, a transformer in said bomb, an oscillator arranged at the surface and connected to the primary of said transformer, a pair of vacuum tubes in said bomb having their grids arranged in series with the secondary of said transformer, a condenser in said bomb connected on one side to the ground wire of the filaments of said tubes and connected on the other side to the plate of one of said tubes, to one of said conductive surfaces and to a source of power at the surface, a conductor connecting the plate of the other of said tubes to a second of said conductive surfaces, a conductor connecting the third conductive surface to a surface circuit, and a recording instrument in said surface circuit having a movable element sensitive to both a constant and a changing voltage.

12. A method for producing a well log which comprises moving a pair of spaced conductors continuously along a bore hole filled with an aqueous fluid at a selected speed, feeding to one of said conductive elements a pulsating unidirectional current, having a frequency so related to the speed of travel of the conductive element that there is at least one cycle per foot of travel of said conductive element along the bore hole, picking up said current after it passes through the substrata around the bore hole by said other conductive element, and recording a value indicative of the rate of change of said current from its minimum to its maximum value and vice versa.

13. A method according to claim 12 in which the pulsating current is one having a square topped wave form.

14. A method for producing a well log which comprises continuously moving a pair of spaced conductive elements along a bore hole filled with an aqueous fluid, feeding to one of said conductive elements a pulsating unidirectional current having a frequency so related to the rate of travel of said conductive element that there is at least one cycle per foot of said travel, picking up said current after it passes through the substrata around the bore hole by said other conductive element, converting said picked up current into a voltage of a value determined by the rate of change of said current, and recording a value indicative of said voltage.

15. A method according to claim 14 in which the pulsating current has a square topped wave form.

LUDWIG W. BLAU.
ROBERT RUSSELL THOMPSON.